United States Patent [19]
Kaneko et al.

[11] Patent Number: 4,719,522
[45] Date of Patent: Jan. 12, 1988

[54] METHOD OF MAGNETIC RECORDING

[75] Inventors: Kiyotaka Kaneko; Chikuni Kawakami; Yasuhito Kobayashi, all of Kanagawa, Japan

[73] Assignee: Fuji Photo Film Co., Ltd., Kanagawa, Japan

[21] Appl. No.: 762,614

[22] Filed: Aug. 5, 1985

[30] Foreign Application Priority Data

Aug. 9, 1984 [JP] Japan ................... 59-165575

[51] Int. Cl.$^4$ .................... H04N 5/78; H04N 9/491
[52] U.S. Cl. .................... 360/38.1; 360/35.1; 360/10.1; 358/314; 358/313
[58] Field of Search .......... 360/38.1, 39, 47, 35.1, 360/10.1, 29; 369/48; 365/200; 358/313, 314, 906

[56] References Cited

U.S. PATENT DOCUMENTS

| | | | |
|---|---|---|---|
| 3,264,623 | 8/1966 | Gabor | 360/47 |
| 3,721,773 | 3/1973 | Kluge | 360/47 X |
| 3,761,903 | 9/1973 | Bird, Jr. et al | 360/47 |
| 4,145,758 | 3/1979 | Drexler et al. | 365/200 X |
| 4,308,612 | 12/1981 | Miyauchi et al. | 369/48 |
| 4,316,223 | 2/1982 | Baldwin et al. | 360/39 |
| 4,494,155 | 1/1985 | Veillard | 360/47 |

FOREIGN PATENT DOCUMENTS 58-121112 7/1983 Japan ................... 360/38.1

Primary Examiner—Aristotelis M. Psitos
Attorney, Agent, or Firm—Abelman Frayne Rezac & Schwab

[57] ABSTRACT

In a magnetic recording method in which, for the purpose of tracking, a signal having a predetermined frequency is extracted from a reproduced FM recording signal recorded on a magnetic recording medium, and the magnetic head is brought to a position where the amplitude of the signal of predetermined frequency becomes substantially maxim; an FM recording signal recorded on a track of the recording medium is reproduced immediately after the recording, when dropout is detected in the recorded signal, a signal having a frequency other than the predetermined frequency is recorded on the same track in a relation superposed on the recorded signal, and the same recording signal as that recorded already on the dropout-including track is recorded on another track which may be the next adjacent track again.

3 Claims, 6 Drawing Figures

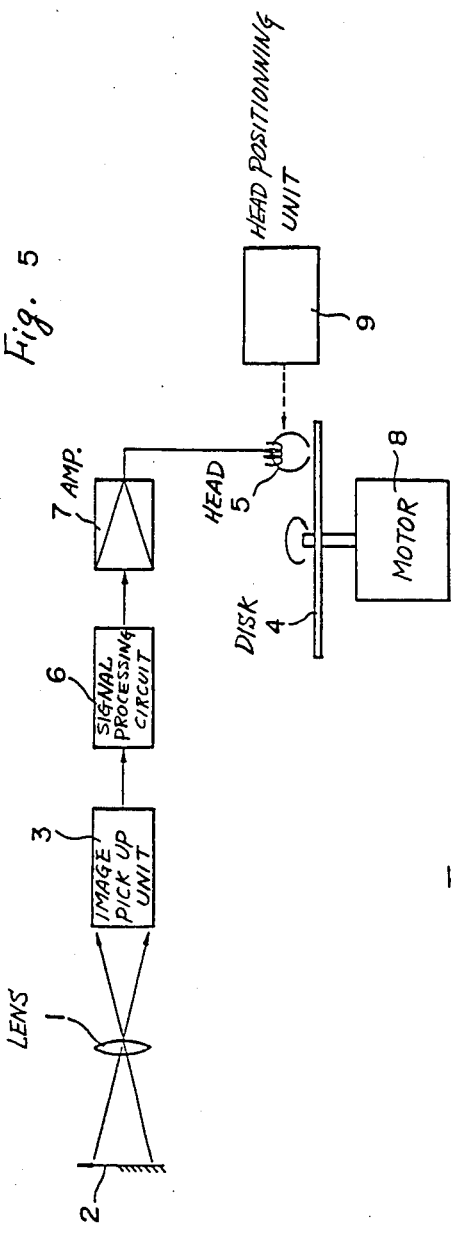
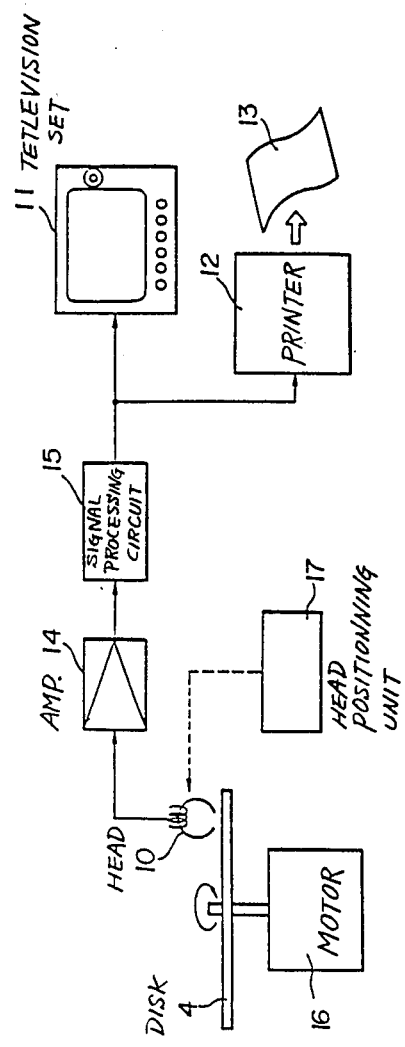

METHOD OF MAGNETIC RECORDING

BACKGROUND OF THE INVENTION

1. Field of the Invention

This invention relates to a method of magnetic recording, and more particularly to improvements made in the recording method so as to exclude dropout from a reproduced output.

2. Description of the Prior Art

Recording using a silver-halide photographic film has recently been gradually replaced by recording using a disk-shaped or card-like magnetic recording sheet on which still pictures are electronically recorded. Especially, standardization of the so-called magnetic disk cameras using a magnetic disk is now being attempted for their commercial practical use. This magnetic disk carema comprises an integral combination of an image pick-up device such as a solid-state image pick-up element or an image pick-up tube and a magnetic disk type recording device. More precisely, as shown in FIG. 5, an optical image of an object 2 is picked up in the form of a still picture by an image pick-up unit 3 through a lens 1, and, after a raster scan type picture signal generated from the image pick-up unit 3 is subjected to signal processing including frequency modulation in a signal processing circuit 6, an output signal of the signal processing circuit 6 is applied through a recording amplifier 7 to a recording magnetic head 5 to be recorded on a circular track on a rotating magnetic disk 4. The magnetic disk 4 is rotated by a drive unit 8, and a position of the magnetic head 5 on the magnetic disk 4 is determined by a head positionning unit 9. A system for reproducing such a magnetically recorded still picture comprises an integral combination of a magnetic disk type reproducing device and picture display unit such as a television set or a hard copy dispensing unit such as a printer. More precisely, as shown in FIG. 6, a predetermined track on a rotating magnetic disk 4 is repeately scanned by a reproducing magnetic head 10, and, after an output signal of the magnetic head 10 is applied through a reproducing amplifier 14 to a signal processing circuit 15 to be subject to signal processing including demodulation, an output signal of the signal processing circuit 15 is applied to, for example, a television set 11 to display a visible picture or a soft copy on its display screen. Alternatively, the output signal of the signal processing circuit 15 is applied to a printer 12 to be printed out on a recording sheet 13 to provide a hard copy. The magnetic disk 4 is rotated by a drive unit 16, and a position of the magnetic head 10 on the disk 4 is determined by a head positioning unit 17.

When dropout occurs or is included in the reproduced output of the magnetic head 10 during reproduction of a still picture, such an output is applied to the television set 11 to be displayed on the display screen. However, since the same still picture signal is repeatedly reproduced for the purpose of display, the dropout appears repeatedly on the same portion of the reproduced still picture, resulting in a very indecent display. Such a situation is also inevitable in the case of a hard copy printed out by the printer.

As is commonly known, occurrence of such dropout is mainly attributable to various defects inherent to a magnetic recording medium, for example, an uneven surface or surface roughness of a supporting base, scars present on the surface of a magnetic material layer and attachment of dust to the surface of the magnetic material layer. Therefore, once dropout has occurred on a track, the dropout would not disappear in most cases even when the still picture signal is recorded again on the same track.

With a view to utilize only such a track which is dropout-free, Japanese patent Application Lay-Open Print No. 51-82516(1976) discloses an idea according to which "when a certain still picture signal is recorded on a certain track, the recorded signal is immediately reproduced, and, if dropout is detected in the reproduced output, the still picture signal recorded immediately before is recorded again on the next adjacent track." Also, this Lay-Open Print discloses an idea according to which "an address number for the purpose of track search is not recorded on the track from which dropout has been detected". Thus, in the playback mode, a track including dropout is automatically skipped so that dropout-free normal pictures only can be succesinely reproduced. The proposed recording method is effectively applicable to the case where many frames of photographic pictures recorded on a conventional silver-halide photographic film or printed on sensitized papers are re-recoreded on a magnetic recording medium in a desired order so that the magnetic recording medium replaces on a photographic album. Especially, a merchant now engaging in the D.P.E(developing, printing and enlarging) business will expect that a business of making an album of pictures using a magnetic recording medium will appear in future. When appearance of such a business is expected, arranging many frames of photographic pictures in the order specified by the user is required, in addition to the guarantee of the good picture quality. Therefore, the aforementioned method of magnetic recording dealing with the problem of occurrence of dropout is quite useful.

However, the prior art method described above is based on the premise that a special address number is recorded at a leading end or trailing end of each track for the purpose of facilitating track search. Therefore, the proposed method is disadvantageous more or less in the following points:

(1) The address number is an address identification signal provided for identification of the corresponding still picture signal. Therefore, the circuit structure of the recording system becomes complex due to the necessity for recording such additional signal.

(2) For specifying the individual tracks, address numbers having different contents respectively must be recorded, resulting a more complex circuit structure.

(3) In the event of occurrence of dropout in the recorded area of an address signal, it is impossible to search the corresponding track. This is attributable to the fact that the presence or absence of dropout is checked for only the recorded area of the still picture signal, and, when the result of checking proves that no dropout is present, the address number is additionally recorded.

SUMMARY OF THE INVENTION

With a view to obviate the prior art disadvantages pointed out above, it is a primary object of the present invention to provide an improved method of magnetic recording in which a signal having a specific frequency included necessarily in a signal to be recorded is utilized so as to check the presence or absence of dropout, without using any especial address signal for checking the presence or absence of dropout.

In accordance with the present invention which attains the above object, there is provided a method of magnetic recording an FM recording signal on a magnetic recording medium so that, for the purpose of tracking, a signal having a predetermined frequency is extracted from the output of a reproducing magnetic head, and said reproducing magnetic head can be brought to a position where the amplitude of said signal of predetermined frequency becomes substantially maximum, said method comprising the steps of recording an FM recording signal on a track of said magnetic recording medium, reproducing said recorded signal immediately to detect the presence or absence of dropout in said track, recording a signal having a frequency other than said predetermined frequency on the same track in a relation superposed on said recorded signal when the result of detection proves that said reproduced signal from said track includes dropout, and recording the same recording signal on another track again.

The above and other objects, features and advantages of the present invention will become more apparent from the following detailed description of preferred embodiments thereof taken in conjunction with the accompanying drawings.

BRIEF DESCRIPTION OF THE DRAWINGS

FIGS. 5 and 6 illustrate the structure and operation of a magnetic disk camera.

DESCRIPTION OF THE PREFERRED EMBODIMENTS

When dropout is detected in a still picture signal recorded on a track of a magnetic disk in the record mode, a signal having a frequency other than a pedetermined frequency is recorded on the same track in a relation superposed on the recorded picture signal. This predetermined frequency is such that the so-called climbing servo action is carried out so that the amplitude of the reproduced signal becomes substantially maximum.

By the superposition of such a signal on the picture signal recorded already on the track, the tracking signal cannot be derived from the track in the playback mode, and the existence of that track is ignored. The still picture signal having the same contents is then recorded on another track which may be the next adjacent track. The magnetic head is accurately positioned on the latter track, so that reproduction of the still picture of good quality can be attained without being adversely affected by the presence of the track on which the dropout has occurred.

The above concept will be described to illustrate an embodiment of the method of magnetically recording a still picture signal according to the present invention. When a composite signal obtained by synthesis of at least a luminance signal and a synchronizing signal in a still picture signal is recorded on a track of a magnetic disk after frequency modulation, a frequency component (a predetermined frequency component corresponding to the sync tip level or pedestal level) is necessarily included in the recorded still picture signal regardless of the picture pattern. Therefore, when the predetermined frequency component is extracted from the output of the reproducing magnetic head, this signal can be used as a tracking signal. Thus, when the envelope of the predetermined frequency signal used as the tracking signal is detected during reproduction of the still picture signal from each of the tracks, and a tracking servo is actuated for detecting the peak position of the detected envelope, the reproducing magnetic head can be accurately positioned on the desired track.

Therefore, when dropout is detected in a still picture signal recorded once on a track of a magnetic disk in the record mode, a signal having a frequency other than a predetermined frequency is recorded on the same track in a relation superposed on the recorded picture signal. Thus, the tracking signal cannot be derived from that track in the playback mode, and the existence of that track is ignored. Then, by recording the still picture signal having the same contents on another track which may be the next adjacent track, the reproducing magnetic head is accurately positioned on this next track in the playback mode, so that reproduction of the still picture of good quality can be attained without being adversely affected by the presence of the track on which the dropout has occurred.

Figure 1:
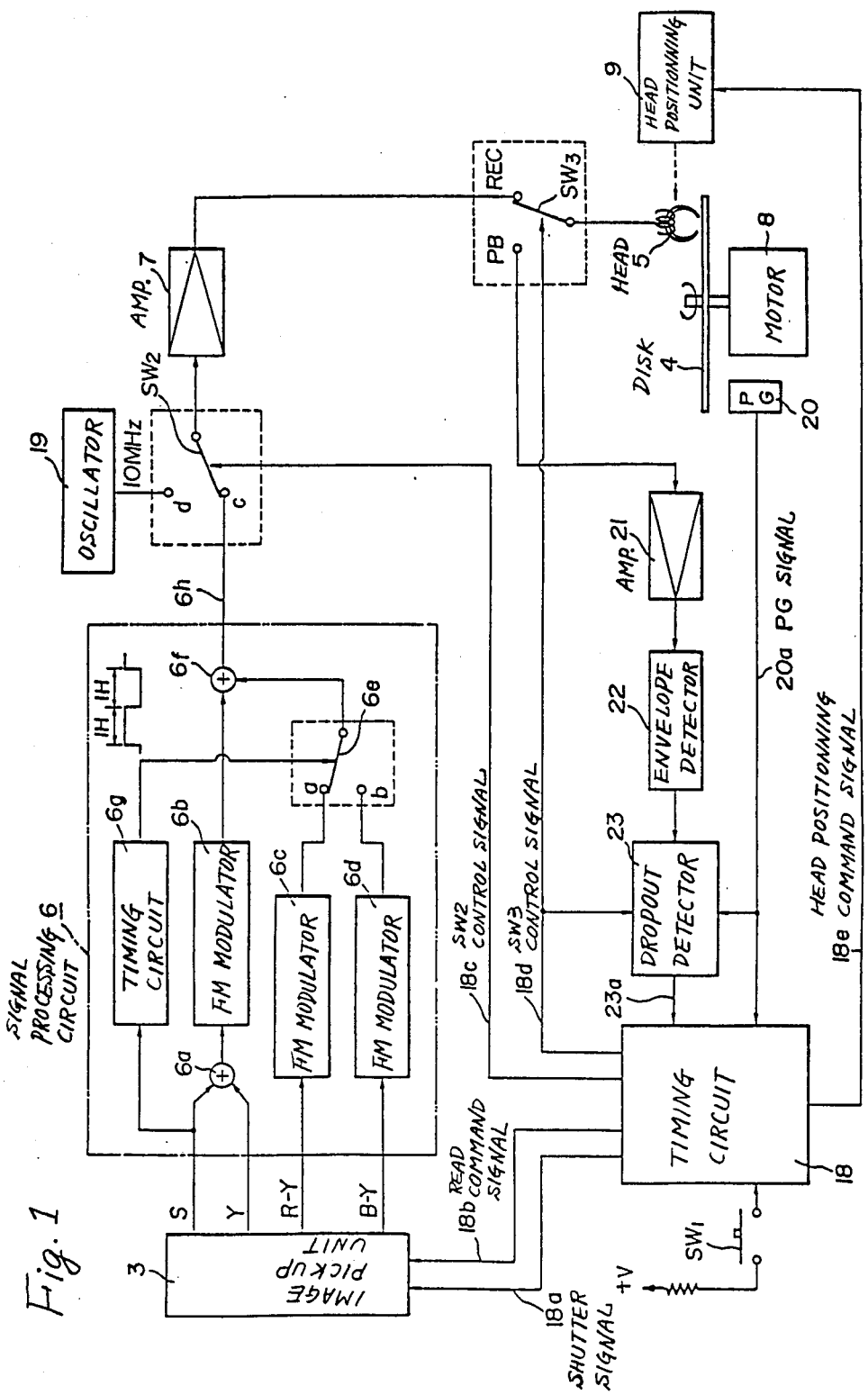
FIG. 1 is a block diagram showing the structure of one form of a recording system adapted for carrying out magnetic recording according to a preferred embodiment of the method of the present invention.
Figure 2:
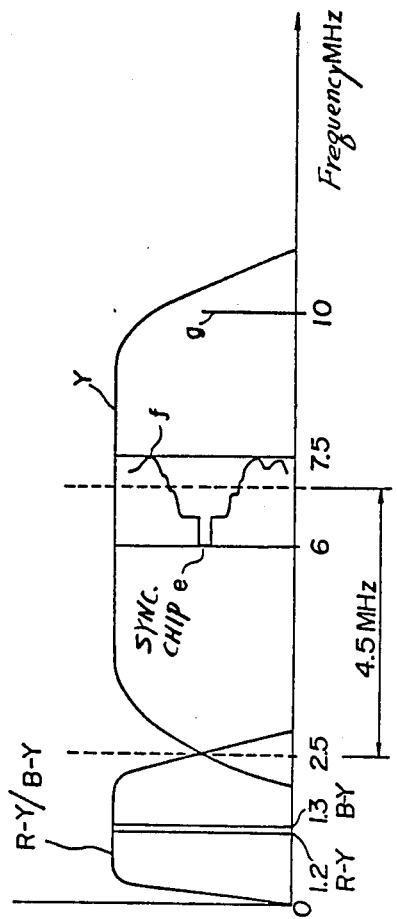
FIG. 2 is a spectrum diagram illustrating one form of frequency modulation in the present invention.
Figure 3:
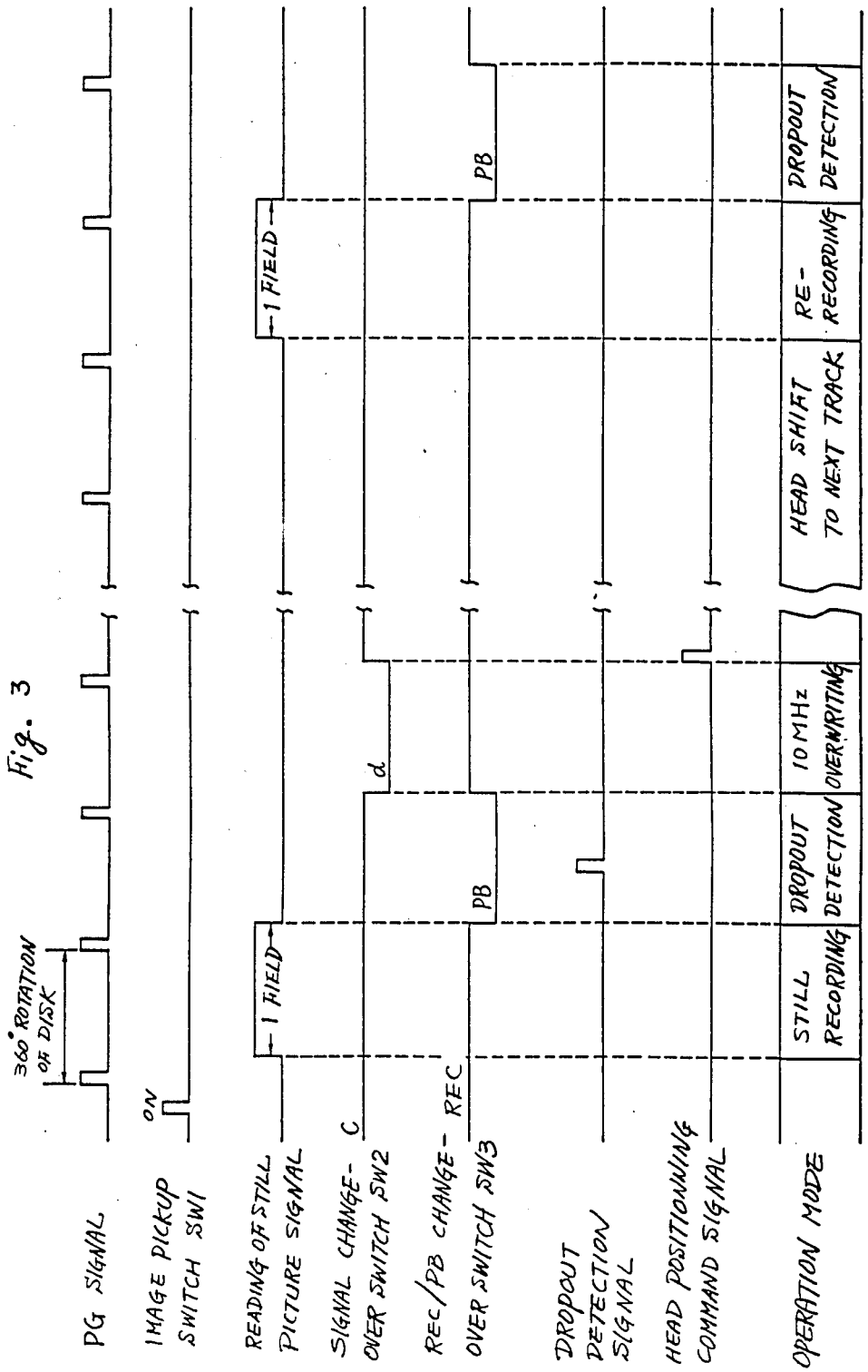
FIG. 3 is a time chart illustrating the operation of the recording system shown in FIG. 1.
Figure 4:
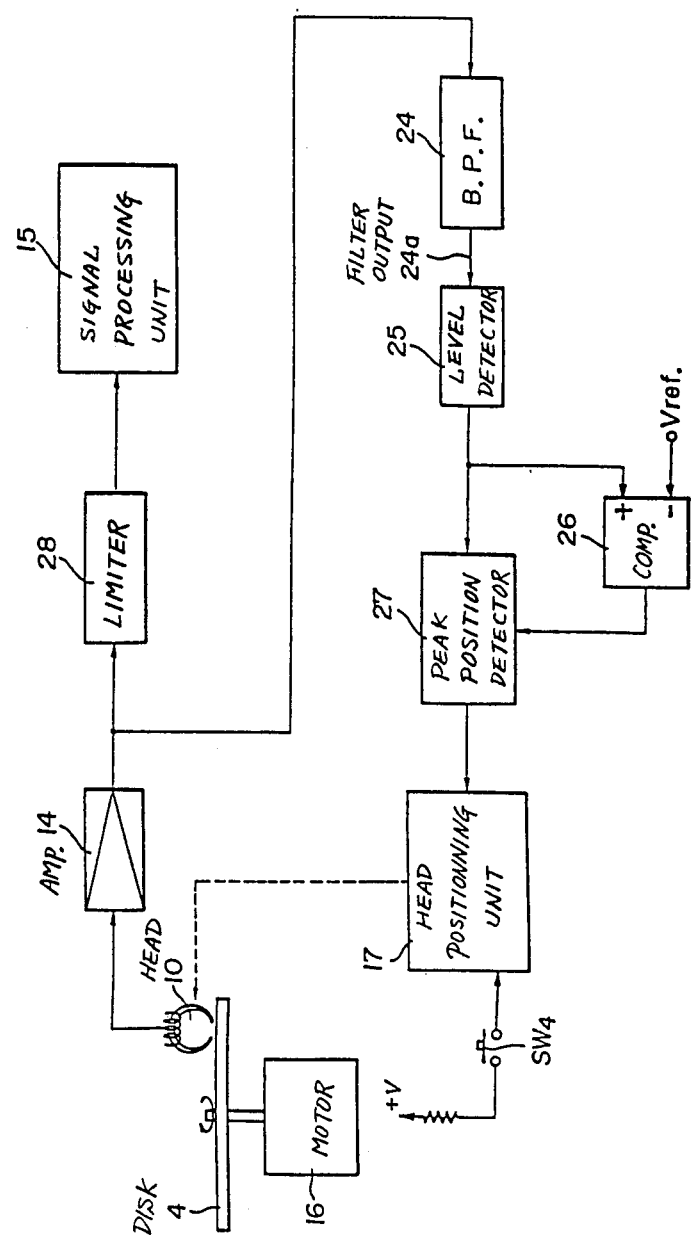
FIG. 4 is a block diagram showing the structure of one form of a reproducing system associated with the recording system shown in FIG. 1.

A preferred embodiment of the present invention will now be described in detail with reference to FIGS. 1 to 4. FIG. 1 is a block diagram showing the structure of a recording system magnetically recording still pictures according to a preferred embodiment of the method of the present invention, FIG. 2 is a spectrum diagram showing one form of frequency modulation of a color video signal in the present invention, FIG. 3 is a time chart illustrating the operation of the magnetic recording system shown in FIG. 1, and FIG. 4 is a block diagram showing the structure of a reproducing system associated with the recording system shown in FIG. 1.

The magnetic recording system shown in FIG. 1 is of the type in which color still picture signals are recorded on circular tracks of a magnetic disk 4 at a rate of one field/one track. Further, two color difference signals R-Y and B-Y are recorded according to the so-called color-difference line sequential FM method in which the two color difference signals R-Y and B-Y are used for frequency modulation of a color subcarrier and alternately recorded at a time internal of 1H, where H is one horizontal scanning period.

Referring to FIG. 1, the recording system includes an image pick up unit 3, a magnetic disk 4, a recording magnetic head 5, a signal processing circuit 6, a recording amplifier 7, a disk drive motor 8, a head positionning unit 9, a timing circuit 18 generating a shutter signal 18a, a read command signal 18b, two switch control signals 18c, 18d and a head positionning command signal 18e, an overwriting signal oscillator 19, a PG unit 20 generating one pulse of a PG signal 20a per 360°-rotation of the magnetic disk 4 for detecting the rotation phase of the magnetic disk 4, an image pickup switch SW1, a recording signal change-over switch SW2, a record/playback change-over switch SW3, a reproducing amplifier 21, an envelope detector 22, and a dropout detector 23 generating a dropout detection signal 23a when dropout is detected.

Each time the image pickup switch SW1 is turned on, the shutter signal 18a is generated from the timing circuit 18 to be applied to the image pickup unit 3. Each time the shutter signal 18a is applied, the image pickup unit 3 makes its image pickup operation. Then, a first read command signal 18b is generated from the timing circuit 18 with a predetermined delay time after the appearance of the PG signal 20a from the PG unit 20. The switch control signal 18c controls the recording signal change-over switch SW2 in such a manner that the switch SW2 is normally in contact with a contact c but is changed over to make contact with a contact d as soon as dropout is detected. The switch control signal 18d controls the record/playback change-over switch SW3 in such a manner that the switch makes contact with a contact REC during recording of a still picture signal, makes contact with a contact PB for the purpose of dropout detection as soon as the recording is completed, and makes contact with the contact REC again as soon as the reproduction for dropout detection is completed.

Referring to FIG. 1, in response to the turn-on of the image pickup switch SW1, the shutter signal 18a is applied from the timing circuit 18 to the image pickup unit 3, and an image corresponding to one filed is picked up. In response to the application of the read command signal 18b to the image pickup unit 3 from the timing circuit 18, a synchronizing signal S, a luminance signal Y and two color difference signals R-Y and B-Y corresponding to one filed of the picked-up image are applied from the image pickup unit 3 to the signal processing circuit 6. After the synchronizing signal S and the luminance signal Y are synthesized or composed by a composer 6a, the composite signal is applied to a frequency modulator 6b in which the signal modulates the frequency of a carrier so that the resultant signal has a frequency deviation of, for example, 1.5 MHz as shown in FIG. 2. In FIG. 2, the sync tip level e and the white peak g are set at 6 MHz and 7.5 MHz respectively. One of the color difference signals R-Y and B-Y, for example, the color difference signal R-Y is applied to a frequency modulator 6c in which the signal modulates the frequency of a subcarrier so that the resultant signal has a center frequency of, for example, 1.2 MHz and a frequency deviation of, for example, 0.7 MHz as shown in FIG. 2. The other color difference signal B-Y is applied to a frequency modulator 6d in which the signal modulates the frequency of a subcarrier so that the resultant signal has a center frequency of, for example, 1.3 MHz and a frequency deviation of for example, 0.5 MHz as shown in FIG. 2. The two FM color difference signals are alternately selected by a line sequential switch 6e at a time interval of 1H and are frequency-multiplexed with the FM luminance signal in a composer 6f. The line sequential switch 6e includes two contacts a and b which are alternately changed over at a time interval of 1H by a square waveform signal having a frequency of, for example, ½fh (fh: the horizontal scanning frequency) and a duty factor of 50% produced by a timing circuit 6g on the basis of the synchronizing signal S.

The processed output signal 6h of the composer 6f, that is, the color still picture signal is applied through the contact c of the recording signal change-over switch SW2 to the recording amplifier 7 to be subject to current amplification. The current-amplified signal is applied through the contact REC of the record/playback change-over switch SW3 to the magnetic head 5 to be recorded on a predetermined track of the magnetic disk 4. In this case, the contact c of the recording signal change-over switch SW2 is selected by the switch control signal 18c applied from the timing circuit 18, and the contact REC of the record/playback change-over switch SW3 is selected by the switch control signal 18d applied from the timing circuit 18, as shown in FIG. 3.

Once the still picture signal has been recorded, the change-over switch SW3 is immediately changed over to make contact now with the contact PB, and the signal of one filed recorded on the track is reproduced for the purpose of detection of dropout, if any. That is, the reproduced signal is applied through the reproducing amplifier 21 to the envelope detector 22 to be subject to envelope detection, and the output of the envelope detector 22 is applied to the dropout detector 23. The dropout detector 23 checks the level of the applied envelope detection signal during the period of one filed in the playback mode and detects the presence or absence of dropout depending on whether or not a level lower than a predetermined level continues for more than a predetermined period of time. When a level lower than the predetermined level continues to appear for more than the predetermined period of time, the dropout detector 23 decides that dropout has occurred. The method for detection and decision of occurrence of dropout is in no way limited to that described above. For example, after recording of the one-field picture signal, the change-over switch SW3 may be changed over to make contact with the contact PB for a predetermined period of time, the reproduced signal may be applied to a monitor for visually deciding the presence or absence of dropout. In such a case, the envelope detector 22 and dropout detector 23 shown FIG. 1 are unnecessary.

Suppose that the presence of dropout is detected in the former case. Then, as soon as the reproduction is completed, the change-over switches SW2 and SW3 are automatically changed over to make contact with the contacts d and REC respectively, and, without changing the track, the output signal of the oscillator 19 is recorded on the same track in a relation superposed on the still picture signal recorded already and including the dropout. On the other hand, when the presence of dropout is detected in the latter case, the operator manually actuates a button commanding overwriting on the specific track. Consequently, as in the former case, the change-over switches SW2 and SW3 are changed over to make contact with the contacts d and REC respectively, and the output signal of the oscillator 19 is recorded on the specific track in a relation superposed on the still picture signal recorded already and including the dropout. This overwriting is in no way limited to the period of one field shown in FIG. 3 and may be continued for a period corresponding to, for example, four fields. As a result of this overwriting, the tracking frequency component included in the still picture signal recorded already is substantially eliminated or greately attenuated. The oscillation frequency of the oscillator 19 may be any one other than a predetermined frequency used for tracking, for example, any one other than that corresponding to the sync tip level (for example, 6 MHz) or that corresponding to the pedestal level (for example, 6.5 Mz). Thus, the oscillation frequency may be any one which is higher or lower than the specific frequencies described above. The essential requirement is merely such that the recorded level of these frequencies used for the envelope detection for the purpose of tracking is greatly lowered. In the present embodiment, satisfactory results can be obtained when the oscillation frequency of the oscillator 19 is 10 MHz as shown at g in FIG. 2.

After overwriting of the signal of 10 MHz, the head positionning command signal 18e is applied from the timing circuit 18 to the head positioning unit 9 to feed the magnetic head 5 toward the next adjacent track. The change-over switch SW2 is changed over to make contact with the contact c. When the magnetic head 5 is accurately positioned on the new track, the read command signal 18b is generated again, and the color still picture signal which is the same as that recorded on the previous track is recorded on the new track again. After recording, the change-over switch SW3 is changed over to make contact with the contact PB, and the presence or absence of dropout is checked again. The recording of the specific image picked up by the image pickup unit 3 is completed when no dropout is detected.

One form of a reproducing system will be described with reference to FIG. 4. Referring to FIG. 4, the reproducing system includes a magnetic disk 4, a reproducing magnetic head 10, a reproducing amplifier 14, a signal processing circuit 15, a drive motor 16, a head positioning unit 17, a band-pass filter 24, a level detector 25, a comparator 26, a peak position detector 27, a limiter 28, and a head feed switch SW4.

The magnetic disk 4 shown in FIG. 4 is that used for recording in the recording system shown in FIG. 1. The head positionning unit 17 is controlled by a control system composed of the band-pass filter 24, level detector 25, comparator 26 and peak position detector 27. The arrangement is such that, when the head feed switch SW4 is turned on to actuate the head positionning unit 17, the magnetic head 10 is brought to a position at which the level of a predetermined frequency, for example, the frequency corresponding to the sync tip level (for example, 6 MHz) or the frequency corresponding to the pedestal level (for example, 6.5 MHz) is higher than a predetermined value and becomes substantially maximum. The band-pass filter 24 is a narrow-band filter whose center frequency is equal to the predetermined frequency described above and which extracts the signal of the predetermined frequency from the signal reproduced from the magnetic disk 4. The level of the output 24a of the band-pass filter 24 is detected in the level detector 25 by means of, for example, envelope detection, and the peak position detector 27 actuates the head-positioning unit 17 until the detected level becomes maximum. On the other hand, when the detected level is lower than the predetermined value, the comparator 26 detects the situation and prevents the peak position detector 27 from making mal-operation due to, for example, noise. In the case of a track including dropout, the oscillator output signal having the frequency of, for example, 10 MHz has been overwritten on the recorded signal, and the level of the reproduced signal of the predetermined frequency is nearly zero. Thus, the magnetic head 10 passes over this track without being positioned thereon, and the track which is free from dropout and having a still picture signal recorded thereon is only reproduced.

The foregoing description has specifically referred to magnetic recording of a picture signal by way of example. However, the present invention is not limited to recording of such a specific signal. Further, the foregoing description has specifically referred to the tracking control on the basis of the frequency corresponding to the sync tip level or pedestal level of the composite signal of the luminance signal and the synchronizing signal in the picture signal. However, the frequency is in no way limited to such a specific level, and the frequency band of, for example, the chroma signal may be employed for tracking.

According to the present invention, a still picture signal recorded on a track of a magnetic disk is immediately reproduced for detecting the presence or absence of dropout, and, if the presence of dropout is detected, the same still picture signal is recorded on the next adjacent track again. Therefore, signal reproduction can be carried out without being adversely affected by the track including the dropout. Especially, according to the present invention, a signal indicative of the address number is not used, but a signal having a frequency other than the frequency used for the tracking control is recorded, on a track having detected dropout, in superposition on the still picture signal recorded already, so that such a track may not be reproduced. Therefore, the circuit structure of the recording system can be simplified.

What is claimed is:

1. A method of magnetic recording still pictures onto an annular track of a magnetic disc using an FM recording signal that provides, for the purpose of tracking, a signal having a pre-determined frequency extracted from a reproducing output of a magnetic head which is brought into a position in which the amplitude said recorded signal of pre-determined frequency becomes substantially maximum, said method comprising the steps of:

recording said FM recording signal onto said annular track of said magnetic disc by use of a magnetic recording reproducing head;

without moving the recording reproducing head, immediately reproducing said recorded signal to detect the presence and absence of drop-outs in the thusly recorded signal;

when the result of detection proves that said recording signal recorded on said track includes a drop-out, then, using said recording reproducing head, and without moving said recording reproducing head, to record a signal on said annular track having a frequency different from said predetermined frequency, and, in superposed relation with said recorded signal, to modify the first recorded signal comprised of said pre-determined frequency to an unintelligible form when reproduced by said recording reproducing head; and, then moving said recording reproducing head and recording the same FM recording signal of said predetermined frequency as that recorded on said drop-out-including track, onto a separate of said disc.

2. The magnetic recording method of claim 1, wherein said FM recording signal is a picture signal representing a single still frame, and said predetermined frequency is that corresponding to the sync tip level of said FM picture signal.

3. The magnetic recording method of claim 1, wherein said FM recording signal is a picture signal representing a single still frame, and said predetermined frequency is that corresponding with the pedestal level of said FM picture signal.

* * * * *